(12) United States Patent
Lemaire et al.

(10) Patent No.: US 7,603,941 B2
(45) Date of Patent: Oct. 20, 2009

(54) HYDRAULIC PUMP OR MOTOR

(75) Inventors: Gilles Lemaire, Margny (FR); Ante Bozic, Compiegne (FR); Jean-Pierre Souply, Senlis (FR)

(73) Assignee: Poclain Hydraulics Industrie, Verberie (FR)

( * ) Notice: Subject to any disclaimer, the term of this patent is extended or adjusted under 35 U.S.C. 154(b) by 526 days.

(21) Appl. No.: 10/533,197

(22) PCT Filed: Oct. 28, 2003

(86) PCT No.: PCT/FR03/03197

§ 371 (c)(1),
(2), (4) Date: Apr. 28, 2005

(87) PCT Pub. No.: WO2004/040132

PCT Pub. Date: May 13, 2004

(65) Prior Publication Data

US 2006/0002802 A1    Jan. 5, 2006

(30) Foreign Application Priority Data

Oct. 29, 2002    (FR)    .................................. 02 13504

(51) Int. Cl.
*F01B 1/06* (2006.01)
*F04B 1/04* (2006.01)
(52) U.S. Cl. ........................................ 91/498; 417/273
(58) Field of Classification Search ................... 91/498; 92/72
See application file for complete search history.

(56) References Cited

U.S. PATENT DOCUMENTS

| 3,141,309 A | * | 7/1964 | Gesell | .......................... 62/401 |
| 4,009,643 A | | 3/1977 | Thumm | |
| 6,347,572 B1 | * | 2/2002 | Martin et al. | .................. 91/491 |

FOREIGN PATENT DOCUMENTS

| DE | 100 33 264 A1 | 10/2001 |
| FR | 2 587 761 | 3/1987 |

* cited by examiner

*Primary Examiner*—Devon C Kramer
*Assistant Examiner*—Philip Stimpert
(74) *Attorney, Agent, or Firm*—Ladas & Parry LLP (57) ABSTRACT

The mechanism such as a motor or a pump comprises a cam (10) and a cylinder block (12) which has a plurality of cylinders (14A, 14B, 14) connected to communication orifices (34A, 35A; 34B, 35B) disposed in a communication face (18). The mechanism further comprises a fluid distributor (20) having a distribution face (22) which is provided with distribution orifices (31A-31F, 32A-32F) suitable for being connected to the feed or to the discharge. The communication orifices and the distribution orifices communicate with one another as the cylinder block and the distributor rotate relative to each other. At least certain cylinders (14A, 14B) are connected to at least two communication orifices (34A, 35A; 34B; 35B) spaced apart angularly ($\alpha$) so that they communicate simultaneously with respective distribution orifices connected to the feed or to the discharge.

12 Claims, 5 Drawing Sheets

HYDRAULIC PUMP OR MOTOR

The present invention relates to a hydraulic mechanism such as a motor or a pump comprising a cam and a cylinder block suitable for rotating relative to each other about an axis of rotation, the cylinder block having a plurality of cylinders connected via cylinder ducts to communication orifices disposed in a communication face of the cylinder block, pistons slidably mounted in the cylinders being suitable for co-operating with the cam, the motor further comprising a fluid distributor, constrained in rotation with the cam about the axis of rotation, and having a distribution face which is provided with distribution orifices comprising orifices suitable for being connected to a feed duct and orifices suitable for being connected to a discharge duct, said distribution face and said communication face facing each other so as to put the communication orifices into communication with the distribution orifices as the cylinder block and the distributor rotate relative to each other.

The speed of rotation of the rotor of such a hydraulic motor is limited by the various types of head loss that are generated in the feed circuit of the motor and, in particular, by the head loss that is generated in the motor itself. Among the various types of head loss, the head loss that is generated in the distribution zone, i.e. where the communication orifices meet the distribution orifices, is the largest.

As the rotor rotates, the communication orifices and the distribution orifices come progressively into register with one another. Thus, the communication cross-section over which the communication orifices and the distribution orifices communicate varies. The slower the variation in communication cross-section as a function of the relative displacement of the communication and the distribution orifices, the larger the head loss.

In order to limit that head loss, it has been proposed to increase the cross-section of the distribution orifices and of the communication orifices. However, that solution has certain limitations because it requires the distribution and the communication faces to have facing areas that are sufficiently large. In addition, providing orifices of large dimensions requires the motor to be provided with a bearing capable of withstanding large forces. When a distribution orifice connected to the fluid feed finds itself facing an uninterrupted zone of the communication face, it exerts a large force thereon.

It has also been proposed, as in FR-A-2 587 761, for example, to give said orifices a particular shape so that the cross-section of communication between a communication orifice and a distribution orifice increases very rapidly from the time at which the two orifices start to communicate.

That solution gives good results, but it still has certain limitations.

An object of the present invention is to improve the above-mentioned prior art further in order to facilitate communication between the distribution ducts of the distributor and the cylinder ducts, by limiting head loss in the distribution zone.

This object is achieved by the fact that at least certain cylinders are connected to at least two communication orifices spaced apart angularly so that, when a first communication orifice of such a cylinder communicates with a first distribution orifice connected to the feed duct or to the discharge duct, a second communication orifice of the same cylinder communicates with a second distribution orifice connected to the same duct.

Compared with prior art motors in which each cylinder has a single communication orifice in the communication face, and if it is considered that the dimensions of the communication orifice and of the distribution orifice remain unchanged, the cross-section available for fluid feed or discharge for the cylinders of the motor of the invention, each of which cylinders has two communication orifices, is doubled. Thus, the head loss is considerably reduced in the distribution zone and the speed of rotation of the rotor of the motor can be increased.

Advantageously, with the cam having n cam lobes, the angular spacing between two communication orifices is substantially equal to a multiple of $360°/n$, i.e. it is equal to a multiple of $360°/n$, ignoring manufacturing tolerances.

A hydraulic motor whose cam has n lobes and having a row of cylinders whose pistons co-operate with said cam has, in the distribution face, n feed distribution orifices, which are spaced apart by $360°/n$ and which are suitable for being simultaneously connected to the feed duct, and n discharge distribution orifices, also spaced apart by $360°/n$ and suitable for being simultaneously connected to the discharge duct. The feed distribution orifices and the discharge distribution orifices are interleaved. If each of the cam lobes has two ramps, respectively a rising ramp and a falling ramp of equal angles, the angular spacing between a feed distribution orifice and the adjacent discharge distribution orifice is equal to $360°/2n$. Thus, in a motor of this type, choosing an angular spacing that is substantially equal to a multiple of $360°/n$ between the two communication orifices of the same cylinder makes it possible to ensure that, as the rotor rotates, the two orifices are connected in the same way, via the distribution orifices, to the feed or to the discharge.

In an advantageous configuration, at least certain cylinders are connected to two communication orifices which are situated substantially or to a large extent within an area of the communication face that is defined by the projection, onto said face and parallel to the axis of rotation, of two generator lines of the cylinder in question that are opposite each other on a diametrical plane of said cylinder that is perpendicular to said axis.

In this configuration, the two communication orifices of the same cylinder are thus situated substantially or to a large extent within the space occupied by said cylinder, as defined by the above-mentioned projection. They are thus very close to each other, and they open out into the cylinder merely via bores parallel to the axis of rotation, which facilitates machining the cylinder ducts that connect said communication orifices to the cylinder in question. For example, it is possible to choose to dispose the two communication orifices symmetrically about the axis of the cylinder and to implement the cylinder ducts of the cylinder in question in the form of two branches that are symmetrical about said axis.

This possibility of disposing the two communication orifices of the same cylinder substantially or to a large extent within the space occupied by the cylinder exists in particular when the motor has a number of cam lobes that is greater than the number of pistons, sufficient for the angular sector covered by the space occupied by the cylinder in the region of the communication orifices to be at least equal to $360°$ C./n, where n represents the number of cam lobes.

In general, it can be advantageous for at least certain cylinders to be connected to two communication orifices which are disposed symmetrically about a plane defined by the axis of the cylinder in question and by the axis of rotation. This makes it possible for the communication orifices and the cylinder ducts to be implemented symmetrically, regardless of whether said communication orifices lie within the space occupied by a cylinder.

In an advantageous embodiment, each cylinder is connected to two communication orifices.

The head loss is thus reduced for all of the cylinders of the motor.

In which case, advantageously, the angular spacing between the two communication orifices of the same cylinder is the same for all of the cylinders.

This configuration simplifies machining of the cylinder block.

Advantageously, with the cam having n cam lobes, said angular spacing is equal to 360°/n.

The two communication orifices of the same cylinder are thus brought closer together so as to limit the lengths of the cylinder ducts.

The invention applies to motors having pluralities of active operating cubic capacities.

Thus, advantageously, the cam has a plurality of cam lobes, each of which comprises a rising ramp and a falling ramp, each of which is associated with a respective distribution orifice, a cam lobe being considered to be active when the distribution orifice associated with its rising ramp is connected to the feed duct and when the distribution orifice associated with its falling ramp is connected to the discharge duct, the hydraulic mechanism having a large active operating cubic capacity in which all of the cam lobes are active, and a small active operating capacity in which only some of the cam lobes are active; the cam lobes that are active in the small active operating cubic capacity are disposed asymmetrically.

Thus, regardless of whether the motor is operating in small cubic capacity mode or in large cubic capacity mode, the two communication orifices of a cylinder whose piston co-operates at a given instant with an active cam lobe, are connected to the same pressure by being connected to distribution orifices that are either at the feed pressure or at the discharge pressure.

The invention will be well understood and its advantages will appear more clearly on reading the following detailed description of embodiments given by way of non-limiting example.

Figure 1:
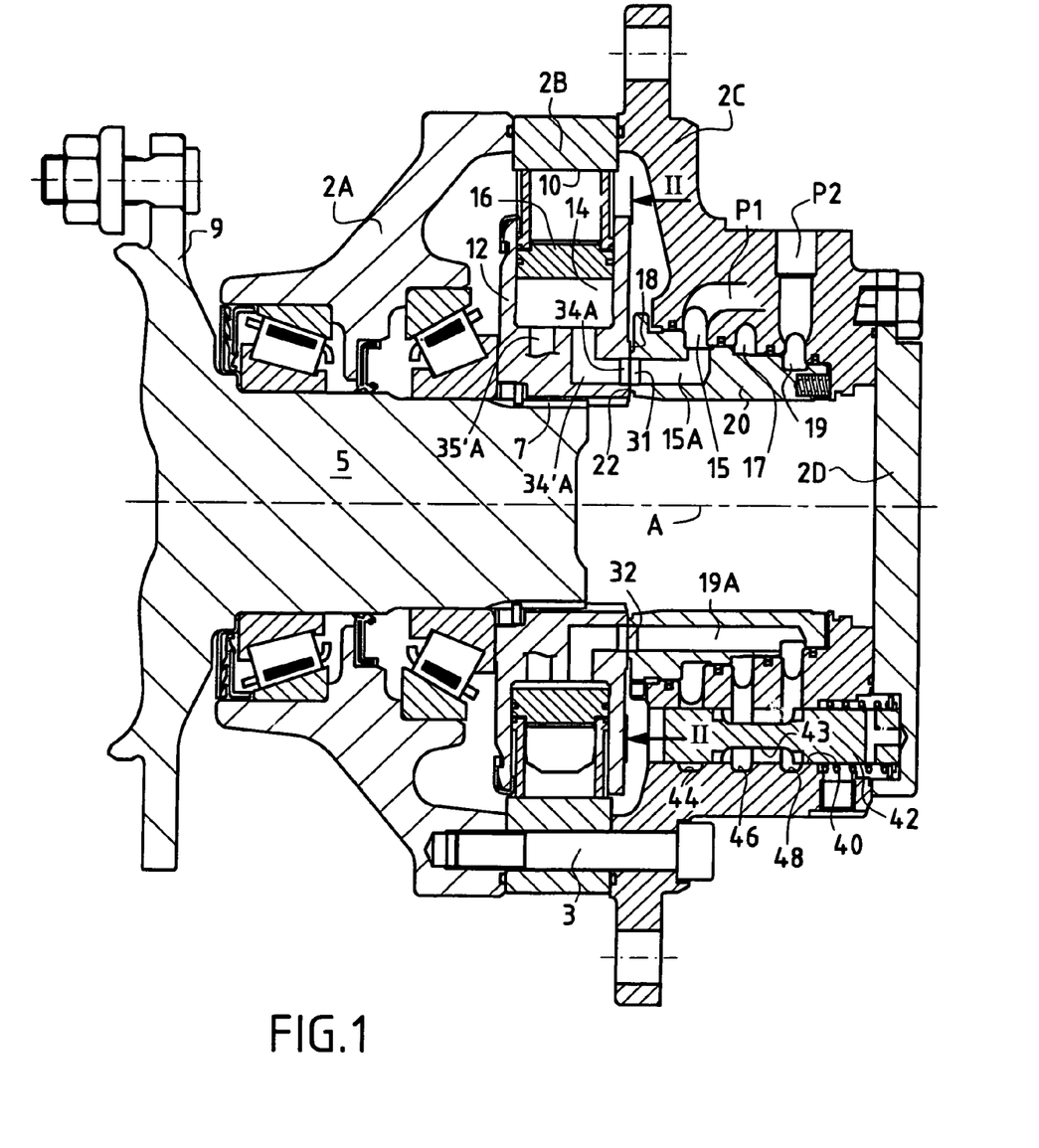
FIG. 1 is an axial section view through a hydraulic motor of the invention.

The description is given with reference to the accompanying drawings, in which:

FIG. 1 shows a hydraulic motor comprising a stationary casing in three portions 2A, 2B, and 2C, assembled together by bolts 3.

Naturally, the invention is not limited to hydraulic motors having stationary casings, but rather it also applies to hydraulic motors having rotary casings and that are well known to the person skilled in the art.

The portion 2C of the casing is closed axially by a radial plate 2D also fastened by bolts. An undulating reaction cam 10 is formed on the portion 2B of the casing.

The motor comprises a cylinder block 12 which is mounted to rotate about an axis of rotation A relative to the cam 10, and which is made up of a plurality of radial cylinders 14 that are suitable for being fed with fluid under pressure and that slidably receive the radial pistons 16.

The cylinder block 12 drives a shaft 5 that co-operates with it via fluting 7. Said shaft carries an outlet flange 9.

The motor further comprises an internal fluid distributor 20 which is constrained to rotate with the casing about the axis A. Distribution grooves, respectively a first groove 15, a second groove 17, and a third groove 19, are formed between the distributor 20 and the internal axial face of the portion 2C of the casing. The distribution ducts of the distributor 20 are disposed in a first group of ducts which, like the duct 15A, are all connected to the groove 15, in a second group of ducts (not shown) which are connected to the groove 17, and in a third group of ducts which, like the duct 19A, are connected to the groove 19. The first groove 15 is connected to a first main duct P1 which is thus connected to all of the distribution orifices of the distribution ducts of the first group, such as orifice 31 of duct 15A. The third groove 19 is connected to a second main duct P2 which is thus connected to all of the distribution orifices of the ducts of the third group, such as orifice 32 of duct 19A.

Depending on the direction of rotation of the motor, the main ducts P1 and P2 are respectively a fluid discharge duct or a fluid feed duct, or vice versa.

The distribution ducts open out in a distribution face 22 of the distributor 20, which face bears against a communication face 18. Each cylinder 14 has two cylinder ducts 34'A, 35'A which open out in the communication face 18 so that, while the cylinder block and the cam are rotating relative to each other, the cylinder ducts are alternately in communication with the distribution ducts of the various groups.

The motor of FIG. 1 further comprises a cubic-capacity selector device which, in this example, is provided with a bore 40 which extends axially in the portion 2C of the casing, and in which an axially movable selector slide 42 is disposed. The bore 40 is provided with three communication ports, respectively 44, 46, and 48, which are connected to respective ones of the grooves 15, 17, and 19, via link ducts. The slide 42 is mounted to move between two end positions inside the bore 40, in which end positions it puts the ports 44 and 46 or the ports 46 and 48 into communication via its groove 43.

The section of FIG. 1 is taken in the communication face 18 of the cylinder block, which face contains the communication orifices of the cylinder ducts which are each connected to a respective cylinder 14. In order to make the present description clearer, the positions of the distribution orifices are also indicated in FIG. 2, even though they do not lie in the section plane.

In addition, although they are not situated in the section plane, the pistons and the cylinders are shown in uninterrupted lines for reasons of simplicity.

As can be seen in FIG. 1, the distribution face 22 and the communication face 18 are disposed facing each other. Since the distribution and the communication orifices are situated at the same distance from the axis A, it is possible to put said communication orifices and said distribution orifices into communication as the cylinder block 12 and the distributor 20 rotate relative to each other.

Figure 2:
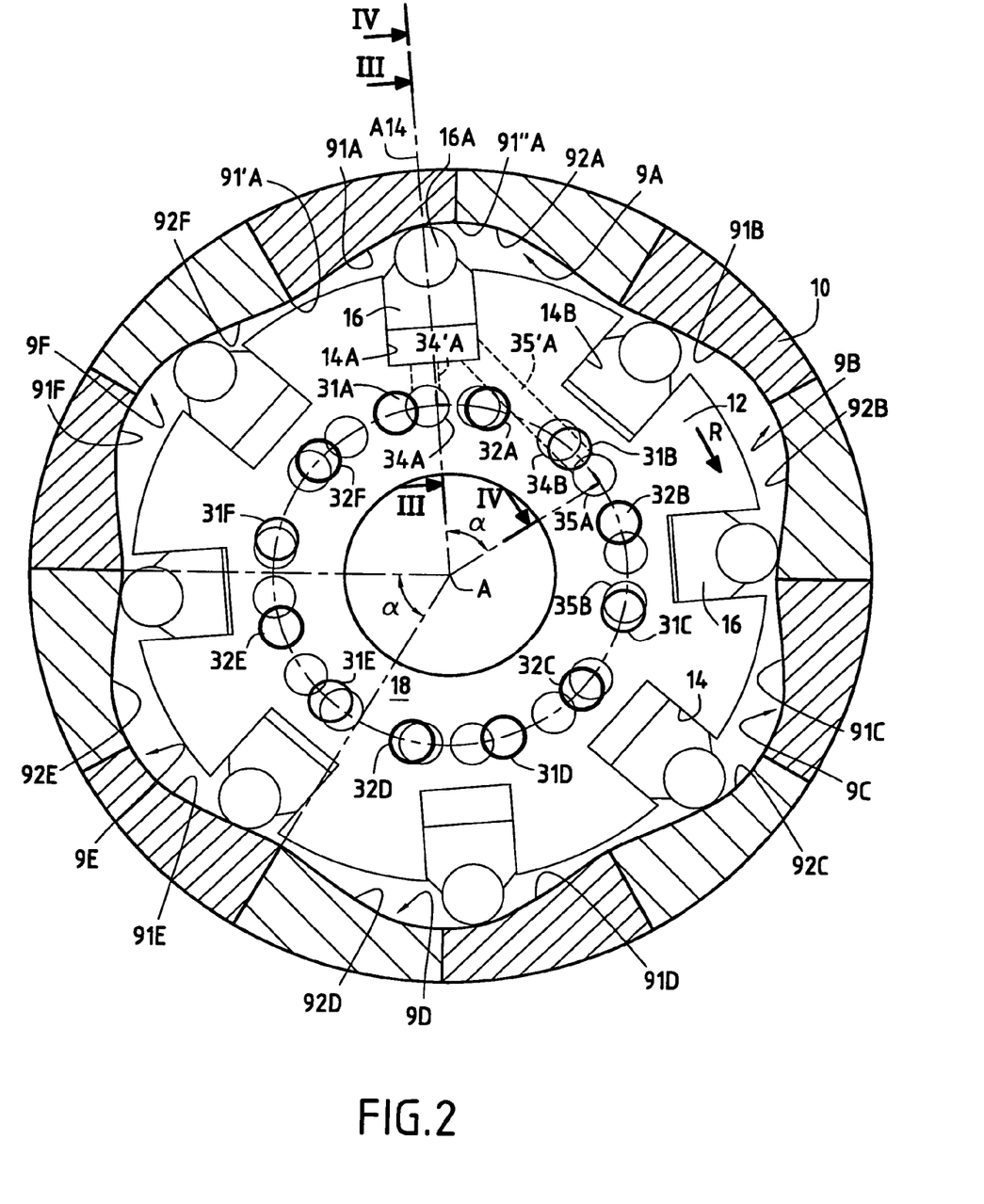
FIG. 2 is a section view on line II-II, taken perpendicularly to the axis of rotation and in the communication face of the cylinder block of a hydraulic motor of the invention.

FIGS. 1 and 2 show a motor having radial pistons and "plane" distribution. The communication and the distribution faces are perpendicular to the axis of rotation, and both of them are plane. In such a case, said communication and distribution faces are held in abutment against each other, with the distributor being urged into abutment with the cylinder block. However, the invention applies to other types of motor, e.g. to motors having cylindrical distribution.

As can be seen in FIG. 2, the cam 10 comprises a plurality of cam lobes, referenced 9A to 9F. Each lobe comprises a rising ramp respectively referenced 91A to 91F, and a falling ramp respectively referenced 92A to 92F. This means that, as the cylinder block rotates in the direction R relative to the cam, those pistons 15 whose wheels 16A co-operate with rising ramps move radially outwards, while those whose wheels co-operate with falling ramps move radially inwards by retracting into their cylinders. Each ramp of a cam lobe is associated with a distribution orifice. Thus, the distribution orifices 31A to 31F are associated with respective ones of the rising ramps 91A to 91F, while the distribution orifices 32A to 32F are associated with respective ones of the falling ramps 92A to 92F. Although the cam is made in one piece, and for reasons of clarity, the rising and the falling ramps are shown with different shading.

In the example shown, each cylinder is connected to the communication face 18 via two communication orifices. Thus, the cylinder 14A whose piston 16 co-operates with the rising ramp 91A of the cam lobe 9A is connected to the communication face 18 via a first communication orifice 34A, and also via a second communication orifice 35A. Similarly, the cylinder 14B whose piston co-operates with the rising ramp 91B of the cam lobe 9B is connected to the communication face via a first communication orifice 34B and via a second communication orifice 35B.

On looking at the cylinder 14A, it can be seen that its communication orifice 34A communicates with the distribution orifice 31A and that, at the same time, its communication orifice 35A communicates with the distribution orifice 31B. The two distribution orifices are connected to the same pressure; in this example, they are both connected to the fluid feed because they are associated with rising ramps, respectively 91A and 91B. It can also be seen that the cross-section of communication between the orifice 34A and the orifice 31A, and the cross-section of communication between the orifice 35A and the orifice 31B are the same. Thus, the cylinder 14A is simultaneously fed with fluid coming from the distribution orifices 31A and 31B and passing through the communication orifices 34A and 35A while the piston 16 is rising on the ramp 91A, from its low end 91'A to its high end 91"A. The communication between the orifice 34A and the orifice 31A, in the same way as the communication between the orifice 35A and the orifice 31B, starts when the wheel 16A of the piston comes into contact with the bottom end 91'A, and ceases when said wheel comes into contact with the high end 91"A.

In this example, each cylinder is provided with two communication orifices, and the above explanations apply for all of the cylinders. In order to avoid cluttering the drawing, numerical references are given only to the communication orifices 34A and 35A that are associated with the cylinder 14A, and to the communication orifices 34B and 35B that are associated with the cylinder 14B. These explanations naturally also apply for co-operation between a piston and a falling ramp and for communication between the communication orifices of the cylinder of said piston and respective ones of two distribution orifices both connected to the discharge duct.

The angular spacing α between the two communication orifices 34A and 35A of the cylinder 14A is chosen so that, while the cylinder block and the cam are rotating relative to each other, the communication between said orifices and respective ones of two distribution orifices opens at the same time and closes at the same time.

The angular position of the distribution orifices relative to the lobes of the cam is fixed since the distributor and the cam are constrained to rotate with each other. The distribution orifices connected to two consecutive rising ramps or to two consecutive falling ramps are spaced apart by a value equal to 360°/n, where n represents the number of cam lobes. That is why the angular spacing α is equal to a multiple of 360°/n.

This condition is necessary so that communication between the two communication orifices of the same cylinder and the respective ones of the two distribution orifices associated with the lobes of the same cam is strictly synchronized.

For each cylinder 14 of FIG. 2, one of the communication orifices intersects a plane defined by the axis of the cylinder in question and by the axis of rotation. Thus, the orifice 34A is centered on the axis A14 of the cylinder 14A. A configuration of this type is conventional for prior art motors having only one communication orifice per cylinder. Conversely, the second communication orifice 35A of the cylinder is spaced apart from the axis A14.

Figure 3:
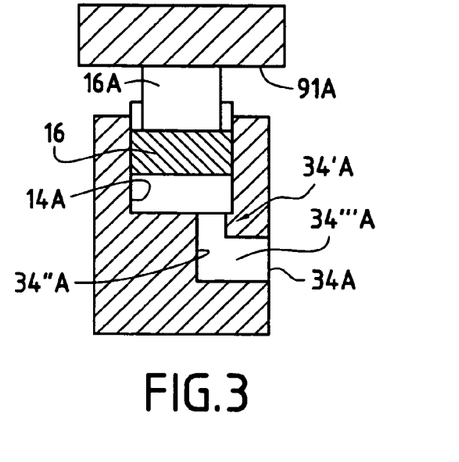
FIGS. 3 and 4 are section views respectively on line III-III and on line IV-IV of FIG. 2.

FIG. 3 shows the configuration of the cylinder duct 34'A that connects the communication orifice 34A to the cylinder 14A. This duct is advantageously formed in a manner such as to have a shape that is as simple as possible, and, for example, it comprises a radial segment 34"A which extends from the end-wall of the cylinder towards the axis of rotation A, and an axial segment 34'"A which opens out at the communication orifice 34A.

Figure 4:
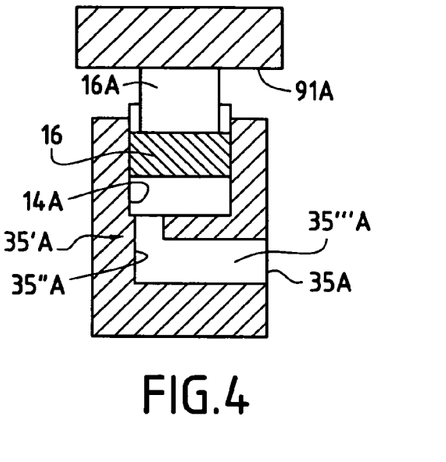

FIG. 4 shows the shape of the cylinder duct 35'A connecting the same cylinder 14A to its second communication orifice 35A. This duct 35'A has a first segment 35"A which is disposed on a slant as seen in a plane parallel to the plane of FIG. 2 so as to cover the angular spacing between the orifices 34A and 35A, and which is connected to a second segment 35'"A which is axial and which opens out at the communication orifice 35A.

It can be seen that the axial segments 34'A and 35'A do not have the same length, so that the segments 34"A and 35"A do not intersect each other. In order to simplify FIG. 2, the only cylinder ducts whose position is indicated are the ducts 34'A and 35'A.

Figure 5:
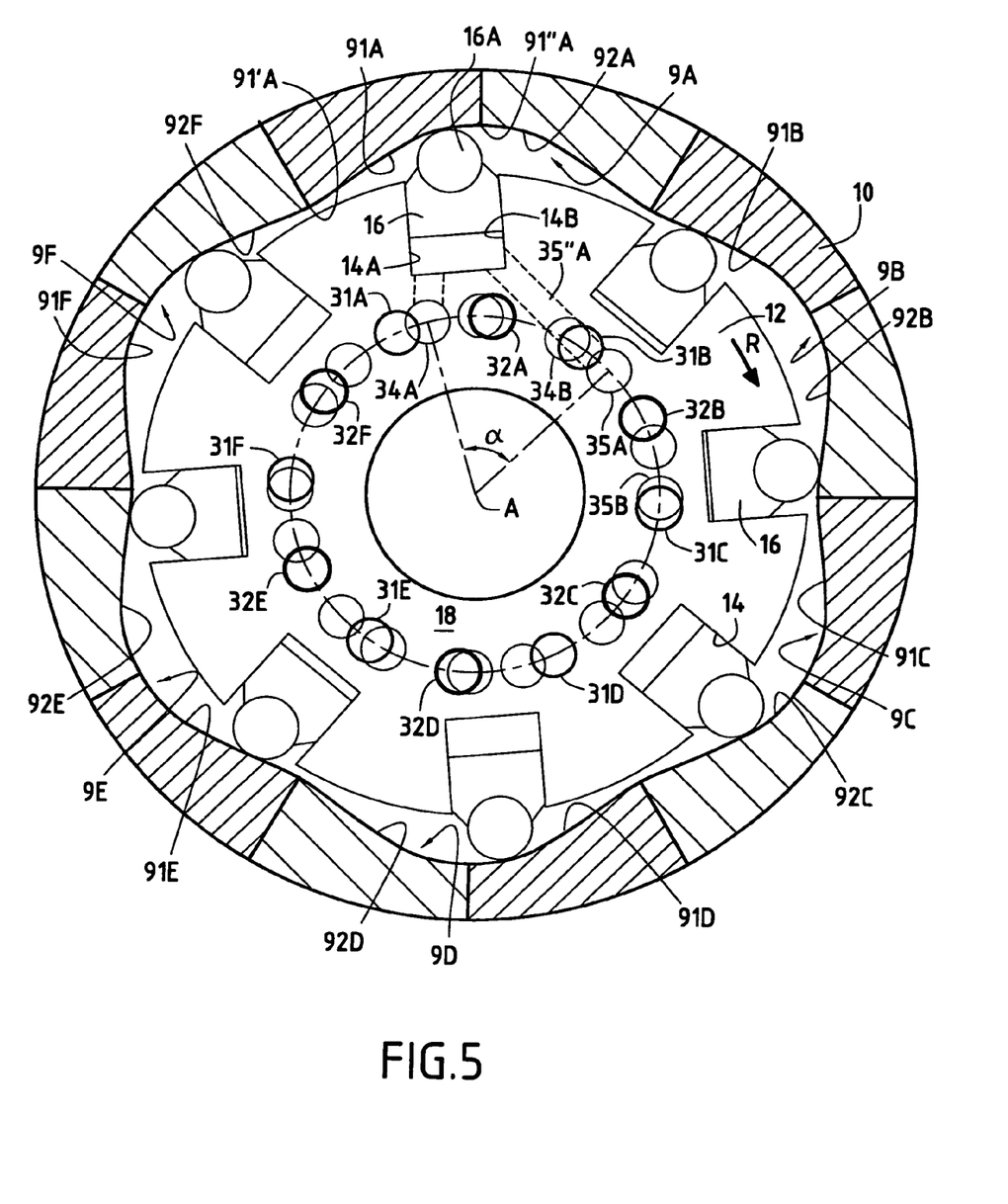
FIG. 5 is a view analogous to the FIG. 2 view, for a variant embodiment.

In FIG. 5, the same references as in FIG. 2 are used.

Each cylinder is provided with two communication orifices, designated by references 34A and 35A for the cylinder 14A. Unlike the configuration in FIG. 2, neither of these two orifices is situated on the axis of its cylinder. In FIG. 5, the orifice 34A is slightly offset relative to the orifice 34A of FIG. 2 in the opposite direction to the direction R. However, the angular spacing α between the two orifices 34A and 35A of the same cylinder is unchanged, and is equal to 360°/n, where n represents the number of cam lobes.

The distribution orifices are also slightly offset relative to the orifices of FIG. 2 in the opposite direction to the direction R. What is important for ensuring that the motor operates properly is that the communication between a communication orifice of a cylinder (e.g. orifice 34A) and a distribution orifice connected to the fluid feed (orifice 31A in this example) opens when, as the cylinder block rotates in the direction R relative to the cam, the piston 16 of the cylinder 14A in question co-operates with the low end 91'A of the rising ramp 91A of the cam lobe with which the distribution orifice in question is associated, and closes when the same piston co-operates with the high end 91"A of said ramp. The angular offset that exists between the communication orifices of FIGS. 2 and 5 is thus the same as the angular offset that exists between the distribution orifices of said Figures.

Figure 6:
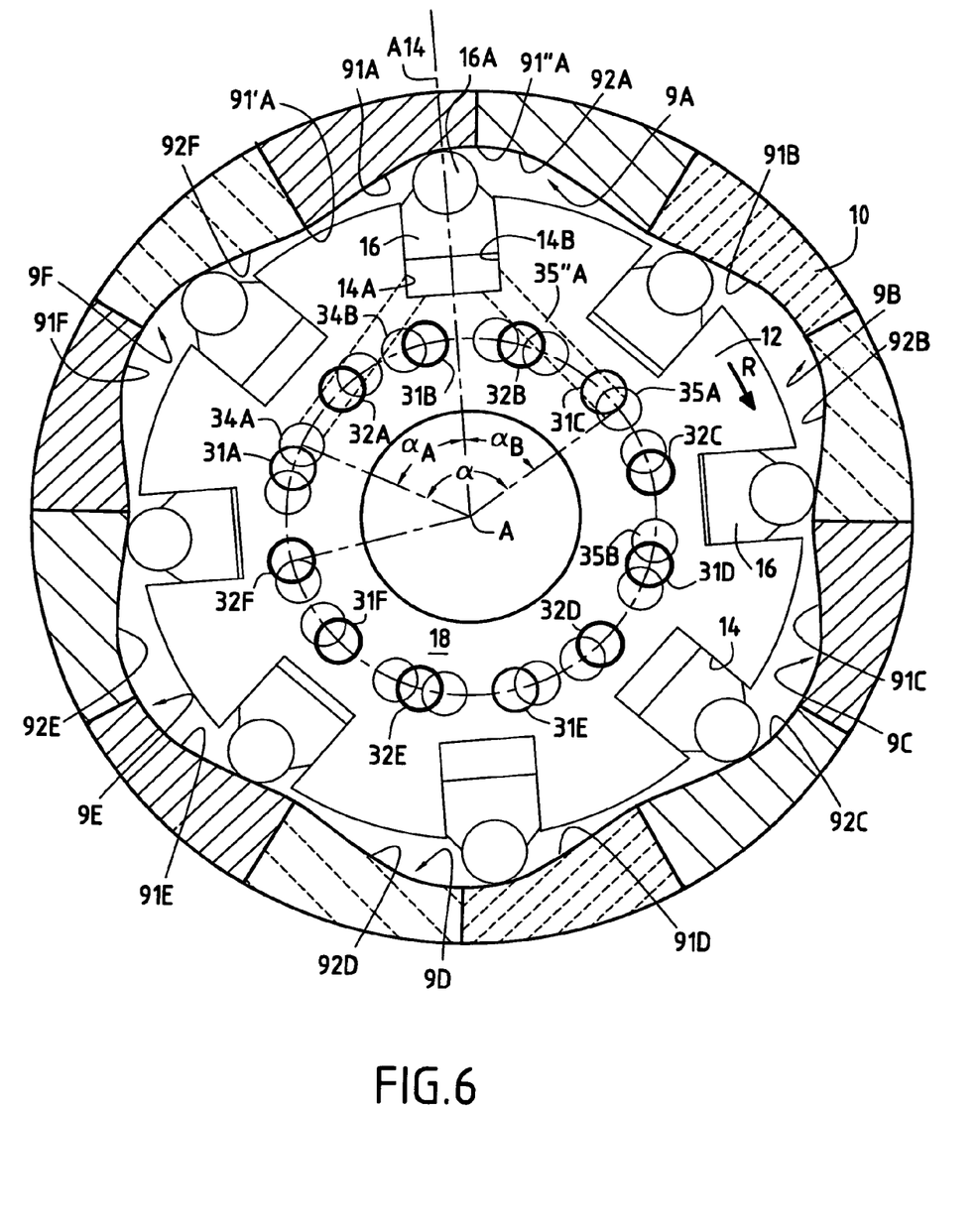
FIG. 6 is a view analogous to the FIG. 2 view, for another variant.

FIG. 6 is described below. In FIG. 6, which uses the same references as FIGS. 2 and 5, the two communication orifices of the same cylinder are disposed symmetrically about a plane defined by the axis of the cylinder in question and by the axis of rotation. Thus, the orifices 34A and 35A of the cylinder 14A are disposed symmetrically about the plane defined by the axis A and by the axis A14 of the cylinder 14A.

It can be understood that the angular spacing αA between a radius starting from the axis A and passing through the center of the orifice 34A, and a projection of the axis A14 on the communication face 18 is equal to the angular spacing αB between said projection of the axis A14 on the communication face, and a radius passing through the center of the orifice 35A. The sum of said angular spaces is equal to the angular spacing α, which is itself equal to twice 360°/n, where n is the number of cam lobes.

In the example shown in FIG. 6, the distribution orifices are offset relative to FIG. 2 to an even further extent than in FIG. 5, to the extent where the distribution orifices associated with one of the ramps of a cam lobe do not even lie within the angular sector covered by said ramp. Thus, the orifice 31A is situated in an angular sector covered by the ramp 91F, while the orifice 32A lies within the space covered by the ramp 92F, but it is when the communication orifice 34A communicates with the orifice 31A (and when, simultaneously, the communication orifice 35A communicates with the distribution orifice 31C) that the piston which is disposed in the cylinder 14A co-operates with the ramp 91A.

Under certain conditions, the two communication orifices of the same cylinder being symmetrical about the projection of the axis of the cylinder on the communication face facilitates machining the cylinder ducts.

As indicated with reference to FIGS. 3 and 4, it is possible to make provision so that each of the cylinder ducts has an axial segment and, so that, for the two cylinder ducts of the same cylinder, the non-axial segments of said ducts do not lie in the same plane, in order to avoid intersections, e.g. between the cylinder duct 14A that opens out into the communication orifice 35A and the cylinder duct of the cylinder 14B that opens out into the communication orifice 34B.

Between the FIGS. 2, 5, and 6, neither the number of cam lobes nor the number of cylinders varies. In this example, the motor has a number of cylinders that is higher than the number of cam lobes.

Figure 7:
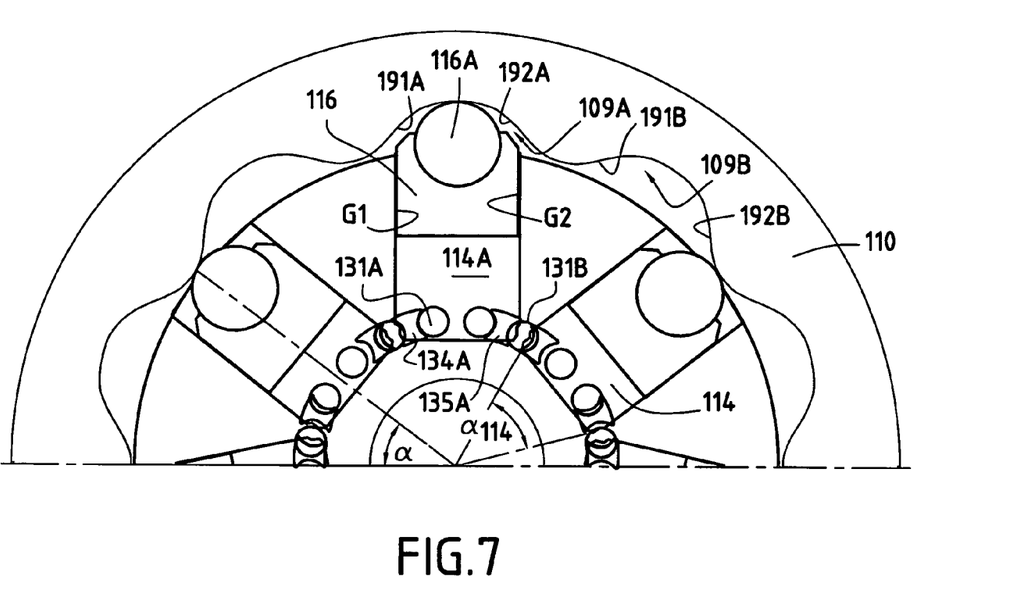
FIG. 7 is a fragmentary view, taken on the same section as FIG. 2, showing yet another variant.

The motor of FIG. 7 is slightly different and references increased by 100 are used to describe it. In this figure, it can be seen that the angular spacing covered by a cam lobe such as 109A or 109B, which is 360°/n, where n represents that number of cam lobes, is less than the angular spacing α114 as measured from the end-wall of a cylinder 114 and covered by said cylinder.

In FIG. 7, the wheel 116A of the piston 116 co-operates with the middle portion of the rising ramp 191A of the cam lobe 109A, and communication between the communication orifices 134A and 135A of the cylinder 114A in which the piston moves and the distribution orifices 131A and 131B is maximized. The two distribution orifices 131A and 131B are two distribution orifices associated respectively with the rising ramps 191A and 191B of two consecutive cam lobes 109A and 109B. Unlike the configurations in the preceding figures, the number of cam lobes is sufficient so that the angular space α covered by a cam lobe is smaller than the angular space α114 covered by a cylinder. Thus, while being spaced apart at an angle α equal to 360°/n where n is the number of cam lobes, the two communication orifices 134A and 135A of the same cylinder 114A can substantially lie within the space occupied by said cylinder. In other words, the two communication orifices are situated within an area of the communication face 118 that is defined by the projection onto said face and parallel to the axis of rotation A of two generator lines G1 and G2 of the cylinder 114A that are opposite each other on a diametrical plane of said cylinder that is perpendicular to the axis A.

This configuration, which is possible only when the ratio between the number of cam lobes and the number of cylinders is sufficiently high, makes it possible to simplify machining of the cylinder ducts that open out into the two communication orifices of the same cylinder, said ducts not intersecting the cylinder ducts of another cylinder.

It can also be noted in FIG. 7 that the communication orifices are of a particular shape, with their sides being concave. This configuration, which is known per se from Document FR-A-2 587 761 makes it possible to ensure that, when a communication orifice starts to communicate with a distribution orifice, the cross-section of communication between the two orifices varies very quickly as the cylinder block and the cam rotate relative to each other. This limits head loss.

Thus, the invention can be used jointly with other particular configurations that are already known for limiting head loss.

It can also be used with communication orifices of any shape, e.g. circular, that might be easier to form.

The motor shown in the figures can have two active operating cubic capacities.

Thus, when the motor is in the large active cubic capacity, all of the cam lobes are active, i.e. all of the distribution orifices associated with the rising ramps are connected to the feed duct and all of the distribution orifices associated with the falling ramps are connected to the discharge duct. Thus, as the cylinder block and the cam rotate relative to each other, the communication orifices of a cylinder are alternately connected to the high pressure and to the low pressure.

In certain motors, the cubic capacity is selected by cams. This means that, in the small active operating cubic capacity, certain cam lobes are active. For example, if FIG. 6 is considered, it is possible to make provision for only the cam lobes 9A, 9C and 9E to be active in the small operating cubic capacity, the distribution orifices 32A, 32C and 32E associated with their respective falling ramps being respectively connected to the fluid feed and to the fluid discharge. In the small active cubic capacity, the other cam lobes are inactive, which means that, for example for the lobe 9B, the distribution orifices 31B and 32B are connected to the same pressure which, depending on the circumstances, can be the fluid discharge pressure, an is auxiliary pressure, or even the feed pressure.

It can be observed that the lobes 9A, 9C, and 9E which are active in the small active operating cubic capacity are disposed asymmetrically. For reasons of clarity of the drawing, the shading of the cam lobes that are active in the small cubic capacity is uninterrupted, while the shading of the cam lobes that are inactive is dashed.

In this case, if k is the number of cam lobes that are active in the small active operating cubic capacity, then the angular spacing between the two communication ducts of the same cylinder must be equal to a multiple of 360°/k. As can be seen in FIG. 6, in order for motor to operate in the small active cubic capacity, it must be possible for the first communication duct 34A of the cylinder 14A to communicate with a distribution orifice 31A associated with the ramp 91A of the cam lobe 9A with which the piston that is disposed in the cylinder in question co-operates, and, at the same time, for the second communication duct 35A of the same cylinder to co-operate with another communication orifice 31C which is also associated with the rising ramp of an active cam lobe (the ramp 91C in this example).

In FIG. 6, the motor has six cam lobes, three of which are active in the small operating cubic capacity, and the angular spacing α between the two communication orifices of the same cylinder is equal to 120°. Naturally, although it can be advantageous to dispose the two communication orifices of the same cylinder symmetrically about a plane containing the axis of said cylinder and containing the axis A of rotation of the motor, the choice of such a configuration is not necessarily related to the possibility of implementing the invention in a motor having at least two active operating cubic capacities, and in which the cubic capacities are selected by the cams.

In addition, the invention naturally applies to motors in which cubic capacity is selected directly by the cylinders. It also applies to motors or pumps having axial pistons and cams presenting a plurality of lobes.

Naturally, when the cylinder ducts are long and of complex shape, and therefore difficult to machine, it is possible to make a communication interface part which can have duct segments that are machined or cast.

The invention claimed is:

1. A hydraulic mechanism comprising a cam and a cylinder block suitable for rotating relative to each other about an axis of rotation, wherein the cam has n cam lobes, n being a positive integer and an angular spacing between two communication orifices of the same cylinder is substantially equal to a multiple of 360°/n, the cylinder block having a plurality of cylinders connected via cylinder ducts to communication orifices disposed in a communication face of the cylinder block, pistons slidably mounted in the cylinders being suitable for co-operating with the cam, the mechanism further comprising a fluid distributor, constrained in rotation with the cam about the axis of rotation, and having a distribution face which is provided with distribution orifices comprising orifices suitable for being connected to a feed duct and orifices suitable for being connected to a discharge duct, said distribution face and said communication face facing each other so as to put the communication orifices into communication with the distribution orifices as the cylinder block and the distributor rotate relative to each other, at least certain cylinders being connected to at least two communication orifices spaced apart angularly so that, when a first communication orifice of such a cylinder communicates with a first distribution orifice connected to one of the feed duct and the discharge duct, a second communication orifice of the same cylinder communicates with a second distribution orifice connected to said one of the feed duct and the discharge duct.

2. A hydraulic mechanism according to claim 1, wherein at least one cylinder is connected to two communication orifices which are situated in an area of the communication face that is defined by the projection, onto said communication face and parallel to the axis of rotation, of two lines of the cylinder in question that are parallel to the cylinder axis and are opposite each other on a diametrical plane of said cylinder that is perpendicular to said axis.

3. A hydraulic mechanism according to claim 1, wherein at least one cylinder is connected to two communication orifices which are disposed symmetrically about a plane defined by an axis of the cylinder in question and by the axis of rotation.

4. A hydraulic mechanism according to claim 1, wherein at least one cylinder is connected to two communication orifices, one of which intersects a plane defined by an axis of a cylinder in question and by the axis of rotation.

5. A hydraulic mechanism according to claim 1, wherein each cylinder is connected to two communication orifices.

6. A hydraulic mechanism comprising a cam and a cylinder block suitable for rotating relative to each other about an axis of rotation, the cylinder block having a plurality of cylinders connected via cylinder ducts to communication orifices disposed in a communication face of the cylinder block, pistons slidably mounted in the cylinders being suitable for co-operating with the cam, the mechanism further comprising a fluid distributor, constrained in rotation with the cam about the axis of rotation, and having a distribution face which is provided with distribution orifices comprising orifices suitable for being connected to a feed duct and orifices suitable for being connected to a discharge duct, said distribution face and said communication face facing each other so as to put the communication orifices into communication with the distribution orifices as the cylinder block and the distributor rotate relative to each other, at least certain cylinders being connected to at least two communication orifices spaced apart angularly so that, when a first communication orifice of such a cylinder communicates with a first distribution orifice connected to one of the feed duct and the discharge duct, a second communication orifice of the same cylinder communicates with a second distribution orifice connected to said one of the feed duct and the discharge duct, wherein the cam has a plurality of cam lobes, each of which comprises a rising ramp and a falling ramp, each of which is associated with a respective distribution orifice, a cam lobe being considered to be active when the distribution orifice associated with the rising ramp of said cam lobe is hydraulically connected to the feed duct and when the distribution orifice associated with the falling ramp of said cam lobe is hydraulically connected to the discharge duct, the hydraulic mechanism having a large active operating cubic capacity in which all of the cam lobes are active, and a small active operating capacity in which only some of the cam lobes are active, and wherein the cam lobes that are active in the small active operating cubic capacity are spaced at regular angular intervals.

7. A hydraulic mechanism according to claim 6, wherein the cam has n cam lobes, n being a positive integer and an angular spacing between two communication orifices of the same cylinder is substantially equal to a multiple of 360°/n.

8. A hydraulic mechanism according to claim 6, wherein at least one cylinder is connected to two communication orifices which are situated in an area of the communication face that is defined by the projection, onto said communication face and parallel to the axis of rotation, of two lines of the cylinder in question that are parallel to the cylinder axis and are opposite each other on a diametrical plane of said cylinder that is perpendicular to said axis.

9. A hydraulic mechanism according to claim 6, wherein at least one cylinder is connected to two communication orifices which are disposed symmetrically about a plane defined by an axis of the cylinder in question and by the axis of rotation.

10. A hydraulic mechanism according to claim 6, wherein at least one cylinder is connected to two communication orifices, one of which intersects a plane defined by an axis of a cylinder in question and by the axis of rotation.

11. A hydraulic mechanism according to claim 6, wherein each cylinder is connected to two communication orifices.

12. A hydraulic mechanism according to claim 11, wherein an angular spacing between the two communication orifices of a cylinder is the same for all of the cylinders.

* * * * *